US00RE39202E

(19) United States
(12) Reissued Patent
Gurantz

(10) Patent Number: US RE39,202 E
(45) Date of Reissued Patent: Jul. 18, 2006

(54) DIGITAL VIDEO CONVERTER BOX FOR SUBSCRIBER/HOME WITH MULTIPLE TELEVISION SETS

(75) Inventor: Itzhak Gurantz, San Diego, CA (US)

(73) Assignee: Conexant Systems, Inc., Newport Beach, CA (US)

(21) Appl. No.: 09/491,032

(22) Filed: Jan. 25, 2000

Related U.S. Patent Documents

Reissue of:
(64) Patent No.: 5,936,660
Issued: Aug. 10, 1999
Appl. No.: 08/988,548
Filed: Dec. 10, 1997

U.S. Applications:
(60) Provisional application No. 60/033,059, filed on Dec. 12, 1996.

(51) Int. Cl.
*H04N 7/20* (2006.01)

(52) U.S. Cl. ..... 725/71; 725/68
(58) Field of Classification Search ..... 725/6, 725/25, 31, 74, 78, 80, 81, 82, 85, 71, 68, 725/120, 119, 118, 83; 348/734
See application file for complete search history.

(56) References Cited

U.S. PATENT DOCUMENTS 4,045,777 A * 8/1977 Mierzwinski et al. ..... 359/146
5,426,701 A * 6/1995 Herrmann et al. ..... 380/52
5,483,277 A * 1/1996 Granger ..... 725/120
5,550,578 A * 8/1996 Hoarty et al. ..... 725/120
5,574,964 A * 11/1996 Hamlin ..... 725/78
5,708,961 A * 1/1998 Hylton et al. ..... 725/81
5,715,020 A * 2/1998 Kuroiwa et al. ..... 348/734
5,828,403 A * 10/1998 DeRodeff et al. ..... 725/131
6,286,142 B1 * 9/2001 Ehreth ..... 725/78
6,288,749 B1 * 9/2001 Freadman ..... 348/552

FOREIGN PATENT DOCUMENTS

GB 2 261 580 A * 5/1993

OTHER PUBLICATIONS

"Functional Model of a Conditional Access System," EBU Project Group B/CA, EBU Review Technical (1995) Winter, No. 266 Grand–Saconnex, CH.*
"A Common Conditional Access Interface for Digital Video Broadcasting Decoders", Giachetti, et al., IEEE Transactions on Consumer Electronics, vol. 41, No. 3, Aug. 1995 New York, US.*
General Instrument, "It turns a television into a video store, shopping, mall, library, brokerage house and more," Introducing th CFT 2200 from General Instrument.*

* cited by examiner

*Primary Examiner*—Christopher Grant

(57) ABSTRACT

A digital video conversion system housing multiple converter chains of units in a single main box chassis. A preferred embodiment uses only a single conditional access unit to authorize decryption of premium channels in response to a smartcard. The conversion system allows a single converter box sharing consolidated decryption (access control) circuitry and a single remote control receiver to provide video output for multiple television sets on the subscriber's premises. In addition to reducing the subscriber's hardware costs per television set, a common access control allows the video service provider to grant a multiple-set discount on a single smartcard.

53 Claims, 2 Drawing Sheets

Household Converter Block Diagram

Digital Video Configuration for Multiple Televisions in a Household

Digital Video Configuration with Household Converter Box.

Household Converter Block Diagram

DIGITAL VIDEO CONVERTER BOX FOR SUBSCRIBER/HOME WITH MULTIPLE TELEVISION SETS

Matter enclosed in heavy brackets [ ] appears in the original patent but forms no part of this reissue specification; matter printed in italics indicates the additions made by reissue.

PRIORITY

This application claims priority from provisional application serial number 60/033,059 filed Dec. 12, 1996, entitled "DIGITAL VIDEO CONVERTER BOX FOR SUBSCRIBER/HOME WITH MULTIPLE TELEVISION SETS" and bearing attorney docket number 1499/102, which is incorporated herein, in its entirety, by reference.

BACKGROUND OF THE INVENTION

The present invention relates to digital video conversion systems, in particular, a system for use with multiple television sets at the home of a single subscriber.

Subscription and pay-per-view video services are delivered to a subscriber's premises via both satellite and cable transmission systems. In cable systems, 6 MHZ analog video and/or digital QAM channels are frequency division multiplexed (FDM) across the 500–1000 MHZ cable bandwidth. In typical satellite systems, several compressed digital video programs are time division multiplexed (TDM) into a single 10–40 Mbits/s QPSK or BPSK modulated C- or K- band carrier. Several carriers may be available to subscribers over several transponders in the satellite.

In order to select and view a program, the received broadcast signal must be tuned, demodulated, and decompressed. Additionally, in the case of premium or pay-per-view programming, authorization must be obtained for the digital data to be decrypted. In traditional systems, these functions are placed in a set-top converter box, which RF modulates the decompressed video for viewing on channel 3 or 4 of a standard television.

The tuning and demodulation functions of the conversion process for cable and satellite systems differ because of their transmission methods. The decompression and RF modulation of the digital video data are similar to both systems. In cable systems, the appropriate 6 MHZ channel is tuned by mixing the received FDM signal to bring the desired channel to an intermediate frequency (IF). The IF QAM signal is then demodulated into the compressed digital video data. For satellite systems, the set-top converter box does not receive the K- or C- band carrier directly, but is fed an amplified signal translated to the L-band. The converter box then tunes the desired channel to an IF frequency. In both systems, the digital video data is decompressed according to pre-defined algorithms (e.g., as an MPEG-2 program), then is modulated as an analog signal for viewing on a television set or monitor.

Because of advantages of digital video broadcast systems over analog systems in the quality, density, and versatility of services, digital systems are projected to soon replace analog transmission systems. However, by their nature, digital set-top converter boxes are more complex and expensive than analog set-tops. Additionally, digital video systems currently require one set-top box for each independently operating television, whereas many televisions are simply split off the cable drop to a household subscribed to an analog system. A television can usually be directly split off an analog system because many sets come equipped with "cable-ready" tuners. "Cable-ready" tuners are relatively inexpensive since they are mere extensions of terrestrial broadcast tuners. Further, premium channels are often authorized by simply removing a notch filter on the cable drop entering the premises of an analog system subscriber. Thus, although digital video transmission systems offer more and better services than analog systems, they suffer a higher cost per television set for a given subscriber.

Controlling the ability to view programming by only authorized subscribers or purchasers is of primary importance in a satellite or cable broadcast system. Unlike free terrestrial broadcasts which are paid by advertising sponsors, satellite and cable systems charge viewers directly for programming. Many access control systems have been deployed and were subsequently defeated. Because of arguments that any access control system can eventually be dissected and defeated, the state-of-the-art system features a "replaceable security" element such as a "smartcard". The smartcard is credit-card sized, and contains an integrated circuit chip for authorizing a unique subscriber. The smartcard is inserted into the set-top box to decrypt premium programming. A smartcard may be used on a pre-paid basis, or can be inexpensively replaced in the event the existing access control system is defeated.

In addition to the cost disadvantage of requiring an individual set-top box for each television in a household, problems also arise in managing access control for a household. For example, additional televisions in the home of an analog cable subscriber are often charged only a nominal fee, based on a multiple-license discount. However, in a digital transmission system with individual set-top boxes per television, a system operator could not offer such a discount since the smartcards could be moved to other homes. At the time to this invention, this necessity to pay for each individually operating set in a household remains a disadvantage of digital systems compared to analog systems.

SUMMARY OF THE INVENTION

Embodiments of the present invention provide a more efficient, single digital video converter box for a subscriber's premises (household) to eliminate the need to use an individual set-top converter for each television in the premises.

According to an embodiment of the present invention, a household converter box accepts a frequency division multiplexed signal containing many channels of modulated digital video programming from either a cable drop or a satellite LNB amplifier. The converter box employs an independent tuning, demodulation, and video decompression chain for each independently operating television set in the house, but shares a common conditional access circuit, remote control receiver, power supply and chassis.

In further accordance with an embodiment of the present invention, each individual tuning, demodulation, and video decompression chain may be housed as a modulator unit which plugs into the main chassis. The individual modules provide a digital output to the conditional access unit for decryption, and a digital input for decompression of the decrypted data stream. Where television sets contain built-in decompression ability (e.g., MPEG-2 decoding ability) and accent digital inputs, a form of the present invention does not decompress and RF modulate the digital program data, but outputs the digital data directly.

In further accordance with an embodiment of the present invention, the household video decoder box will contain a single remote control receiver which accepts commands from the various remote control transmitters associated with each television on the subscriber's premises. A single remote control receiver, as opposed to individual receivers in individual set-top boxes reduces costs per television set on a subscriber's premises. Since the remote control receiver can be separated from each transmitter by one or more walls, infrared or other line-of-sight modulation schemes cannot be used, but an RF band is used in the present invention.

In further accordance with an embodiment of the present invention, the output of the conversion box of the individually operating television sets can be over a number of media, including a wireless RF link. For example, an RF modulated analog video signal on channel 3 or 4 may be carried from the household conversion box to the individual television sets over separate coax links. Similarly, direct baseband digital data from the converter box may be carried to the individual sets over twisted wire pair links. Additionally, the selected video program may be transmitted to the individual television sets over a local, low-power wireless RF link, in analog or digital form.

The present invention is advantageously able to operate multiple television in a subscriber's premises through the same conditional access device. Prior to this invention, each television subscribed to a digital video transmission system required its own set-top box, and because of replaceable security, it's own smartcard. This arrangement makes it difficult for a digital video service to allow a household multiple-set discount, common in analog cable services, because smartcards could be easily moved to other households. The present invention allows the use of a single smartcard for a subscriber, and enables a digital video service provider to competitively offer a multiple set household discount.

The following benefits are obtained from the present invention: (1) a reduced cost per television set in a household viewing digital video transmissions, (2) a secure method of identifying all of a subscriber's digital video television decoders through a single conditional access unit, and (3) a simpler method of decoding digital television transmissions for a single subscriber premises, or household.

DETAILED DISCUSSION OF THE PRESENTLY PREFERRED EMBODIMENTS

Figure 1:
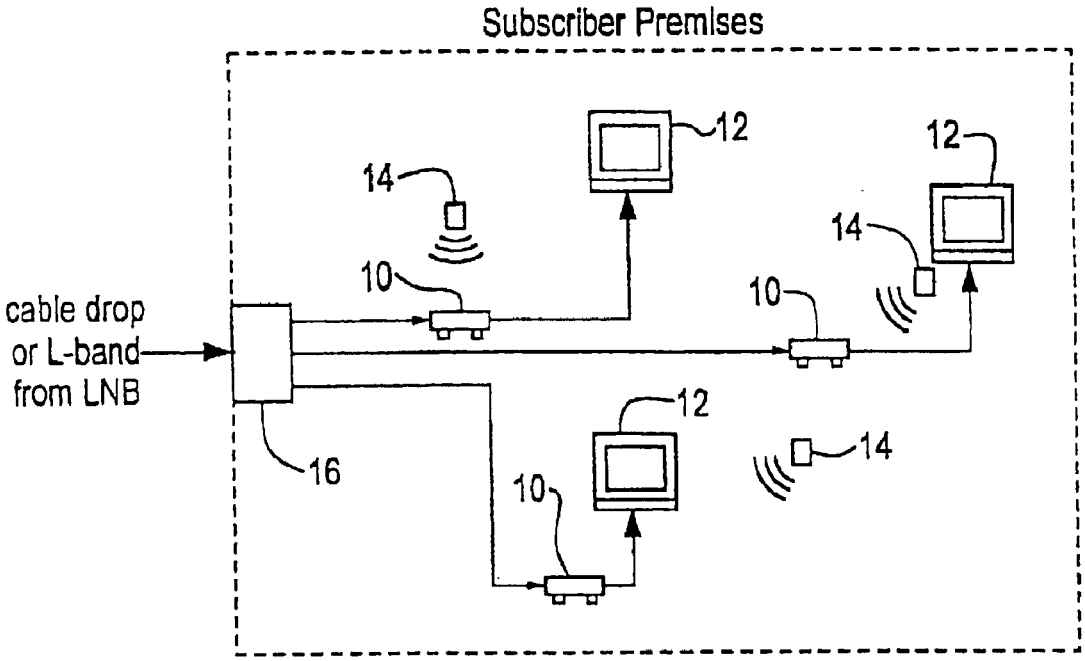
FIG. 1 PRIOR ART
FIG. 1 is a block diagram of a prior art configuration for providing digital video to multiple television sets in a single household.

In the prior art, a single household could use an individual digital video decoder settop box 10 for each independently operating television set 12, as in FIG. 1. As used herein, a television set may be any video signal display device including conventional televisions and computer monitors. Each set-top box 10 has a remote control 14 associated with it. The signals into the household are split by splitter 16 for delivery to each of the set-top boxes 10. In addition to a constant cost per television in the household, each set-top would probably be authorized as an individual subscriber, independent of one another. Each set-top 10 would have it's own conditional access unit, and as systems often use such replaceable security elements, it's own smartcard.

Figure 2:
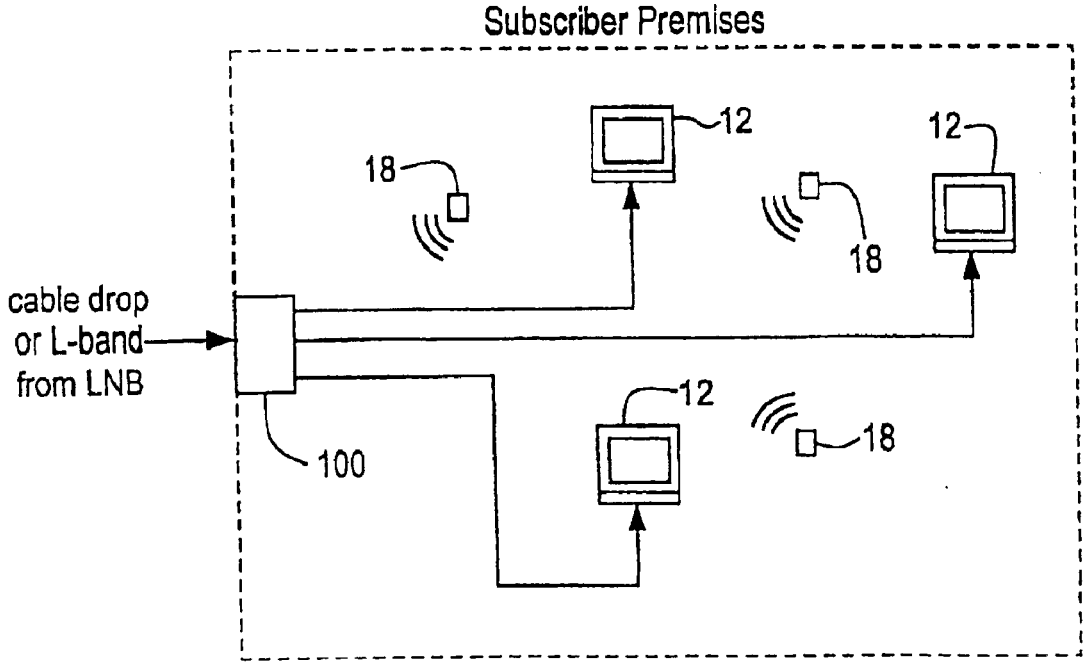
FIG. 2 is a block diagram of a configuration of the present invention for providing digital video to multiple television sets in a single household.

The present invention allows the use of a single converter box for cable or satellite pay-per-view and/or subscription digital video system, using a single conditional access unit (smartcard). A typical example of this single household digital video converter box 100 is shown in FIG. 2, for three television sets 12 in the home. Each television set has a remote control 18 associated with it for communication with the converter box 100.

Figure 3:
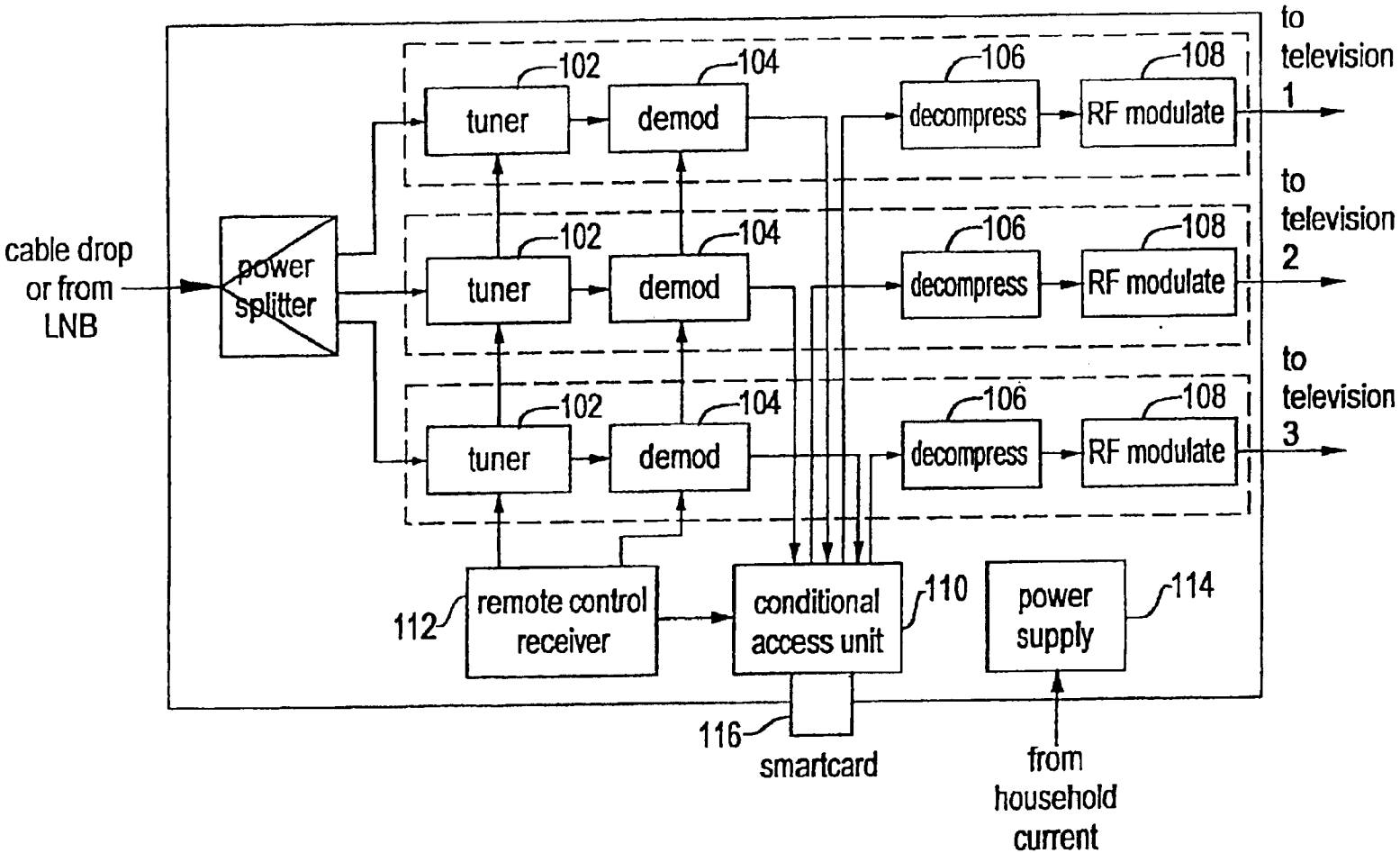
FIG. 3 is a block diagram of a household digital converter of an embodiment of the present invention.

A block diagram of the household digital video converter box 100 is shown in FIG. 3. For serving a plurality of television sets, the converter box includes a plurality of chains, each including a tuner 102, a demodulator 104, a decompression unit 110 and an RF video modulation unit 108. The chains share a single conditional access unit 110 and one or more remote control receivers 112 for all household sets, and a single power supply 114 and chassis. The input to the converter box provides the television signals. Current examples of such inputs include a cable drop with 6 MHZ QAM channels FDM'ed (frequency division multiplexed) over the 500–1000 MHZ bandwidth, or an L-band FDM signal of a number of 10–40 MHZ QPSK/BPSK satellite channels from an LNB. The conditional access unit 110 operates with a single smartcard 116.

The FDM signal from the cable drop or LNB is power split in the converter box, and fed to the individual tuner/demodulator/decompression/modulator units. The individual converter units are modularly inserted into the main chassis in the preferred embodiment. This modularity allows the subscriber to purchase only the amount of hardware required for his household. In other embodiments, a fixed number of tuner/demodulator/decompression/modulator units may be configured. The converter units accept commands from the remote control receiver 112 to tune a desired FDM channel. The selected channel is demodulated from the QAM or QPSK/BPSK signals in a cable or satellite converter box, respectively, into digital data to be decrypted by the conditional access unit 110. The conditional access unit outputs the decrypted digital data on a baseband video signal. The decrypted digital data is then input back into the units to be decompressed according to predetermined algorithms (e.g., as an MPEG-2 stream). The decompressed video is then modulated into an RF analog signal viewed on a standard television set typically on channel 3 or 4. The RF signals from the decoder box to the individual television sets are carried on separate coaxial cable segments. In configurations where television sets have built-in decompression ability and accept direct digital video data, the modular units contain only tuner and demodulation functions, and baseband digital data is output from the converter to the televisions in the subscriber's home. In the latter embodiment, the baseband digital data may be carried from the converter box to the individual television sets over twisted wire pair, coax, or wireless RF means.

In the preferred embodiment, a single RF remote control receiver services individual remote control transmitters associated with the independently operating televisions in the household. The remote control transmitters 18 use the RF band, as opposed to infrared, because a (reflected) line-of-sight is not always available to the single decoder box.

Of course, it should be understood that various changes and modifications to the preferred embodiments described above will be apparent to those skilled in the art. For example, a less efficient implementation of the invention may be configured with a plurality of remote control receivers, one for each chain of converter units. Also, the system of the invention is applicable regardless of the content of the signals being processed. The signals may include broadcast television programs, cable programs, interactive games, computer data, etc. for display on a television or monitor. These and other changes can be made without departing from the spirit and scope of the invention and without diminishing its attendant advantages. It is therefore intended that such changes and modifications be covered by the following claims.

I claim:

1. A digital video conversion system comprising:

a chassis having a plurality of outputs, each output being adapted to provide a decrypted television signal for delivery to an individual television set;

a plurality of converter chains housed within said chassis, each chain including at least a tuner and a demodulator;

at least one conditional access unit, housed within said chassis, connected to said plurality of converter chains and having an authorization input, for decrypting digital demodulated signals from said plurality of converter chains upon receiving an authorized input through the authorization input; and at least one remote control receiver unit, housed within said chassis, responsive to commands from individual remote controls associated with the individual television sets for controlling said converter chains and said at least one conditional access unit.

2. A digital video conversion system of claim 1 wherein said at least one conditional access unit comprises only a single conditional access unit connected to said plurality of converter chains.

3. The digital video conversion system of claim 2 wherein the authorized input for enabling said single conditional access unit with respect to demodulated signals from any of the converter chains comprises a single smartcard.

4. The digital video conversion system of claim 2 wherein said at least one remote control receiver unit is a single RF remote control receiver responsive to any of the individual remote controls.

5. The digital video conversion system of claim 1 wherein each of said converter chains further includes a decompression unit for receiving decrypted signals from said at least one conditional access unit and an RF modulator coupled between the decompression unit and one of the outputs.

6. The digital video conversion system of claim 1 wherein the tuner and the demodulator of at least one of the converter chains are each housed in individual modular units that can be plugged into said chassis.

7. A digital video conversion system connected to a cable drop, said system comprising:

*a plurality of system outputs;* a splitter connected to said cable drop for simultaneously generating a plurality of frequency division multiplexed 6 MHZ QAM signals;

a plurality of converter chains, each chain including at least a tuner and a demodulator for receiving one of the frequency division multiplexed 6 MHZ QAM signals;

a single conditional access unit, connected to said plurality of converter chains and having an authorization input, for decrypting demodulated QAM signals from said plurality of converter chains upon receiving an authorized input through the authorization input and said single conditional access unit individually outputting a plurality of decrypted signals simultaneously, each decrypted signal being [associated with] *directed to* one of a plurality of individual television sets *via one of the plurality of system outputs*; and at least one remote control receiver unit responsive to commands from individual remote controls associated with the individual television sets for controlling said converter chains and said single conditional access unit.

8. The digital video conversion system of claim 7 wherein the authorized input for enabling said single conditional access unit with respect to demodulated QAM signals from any of the converter chains comprises a single smartcard.

9. The digital video conversion system of claim 7 wherein said at least one remote control receiver unit is a single RF remote control receiver responsive to any of the individual remote controls.

10. [The digital video conversion system of claim 7 wherein] *A digital video conversion system connected to a cable drop, said system comprising:*

*a splitter connected to said cable drop for simultaneously generating a plurality of frequency division multiplexed 6 MHZ QAM signals;*

*a plurality of converter chains, each chain including at least a tuner and a demodulator for receiving one of the frequency division multiplexed 6 MHZ QAM signals;*

*a single conditional access unit, connected to said plurality of converter chains and having an authorization input, for decrypting demodulated QAM signals from said plurality of converter chains upon receiving an authorized input through the authorization input and said single conditional access unit individually outputting a plurality of decrypted signals simultaneously, each decrypted signal being associated with one of a plurality of individual television sets,* each of said converter chains further [includes] *including* a decompression unit for receiving one of the decrypted signals from said single conditional access unit and an RF modulator coupled between the decompression unit and a connection to one of the individual television sets*; and*

*at least one remote control receiver unit responsive to commands from individual remote controls associated with the individual television sets for controlling said converter chains and said single conditional access unit.*

11. [The digital video conversion system of claim 7] *A digital video conversion system connected to a cable drop, said system comprising:*

*a splitter connected to said cable drop for simultaneously generating a plurality of frequency division multiplexed 6 MHZ QAM signals;*

*a plurality of converter chains, each chain including at least a tuner and a demodulator for receiving one of the frequency division multiplexed 6 MHZ QAM signals;*

*a single conditional access unit, connected to said plurality of converter chains and having an authorization input, for decrypting demodulated QAM signals from said plurality of converter chains upon receiving an authorized input through the authorization input and said single conditional access unit individually outputting a plurality of decrypted signals simultaneously, each decrypted signal being associated with one of a plurality of individual television sets;*

*at least one remote control receiver unit responsive to commands from individual remote controls associated with the individual television sets for controlling said converter chains and said single conditional access unit,* wherein each individual television set is associated with one of the converter chains and each converter chain performs the functions of:

tuning to a selected frequency division multiplexed, digitally modulated QAM video signal;

demodulating the selected digitally modulated QAM video signal;

providing the demodulated video signal to said single conditional access unit;

decompressing the decrypted signal from said single conditional access unit; and modulating the decompressed video signal into an analog video signal for viewing on the associated individual television set.

12. The digital video conversion system of claim 7 further comprising a main conversion box chassis which houses *said system outputs,* said splitter, said converter chains, said single conditional access unit and said at least one remote control receiver unit and wherein the tuner and the demodulator of at least one of the converter chains are each housed in individual modular units that can be plugged into the main conversion box chassis.

13. The digital video conversion system of claim 7 wherein each individual television set is associated with one of the converter chains and each converter chain performs the functions of:

tuning to a selected frequency division multiplexed, digitally modulated QAM video signal;

demodulating the selected digitally modulated QAM video signal;

provided the demodulated video signal to said single conditional access unit; and outputting the decrypted signal from said single conditional access unit to the individual television set.

14. A digital video conversion system connected to a television signal source, said system comprising:

*a plurality of system outputs;* a splitter connected to said signal source for simultaneously generating a plurality of copies of television signals received from said signal source;

a plurality of converter chains, each chain connected to receive one of the copies of the television signals and including at least a tuner for tuning to a selected digitally modulated video channel and a demodulator for demodulating digital video data on the selected video channel;

a single conditional access unit, connected to said plurality of converter chains and having an authorization input, for decrypting the demodulated digital video data from said plurality of converter chains upon receiving an authorized input through the authorization input and said single conditional access unit individually outputting a plurality of decrypted baseband video signals simultaneously, each decrypted baseband video signal being [associated with] *directed to* one of a plurality of individual television sets *via one of the plurality of system outputs*; and at least one remote control receiver unit responsive to commands from individual remote controls associated with the individual television sets for controlling said converter chains and said single conditional access unit.

15. The digital video conversion system of claim 14 wherein said signal source comprises an LNB of a satellite antenna and the television signals provided by said signal source comprise L-band frequency division multiplexed digitally modulated channels.

16. The digital video conversion system of claim 14 wherein the authorized input for enabling said single conditional access unit to decrypt demodulated digital video data comprises a smartcard.

17. The digital video conversion system of claim 14 wherein said at least one remote control receiver unit is a single RF remote control receiver responsive to any of the individual remote controls.

18. [The digital video conversion system of claim 14 wherein] *A digital video conversion system connected to a television signal source, said system comprising:*

*a splitter connected to said signal source for simultaneously generating a plurality of copies of television signals received from said signal source;*

*a plurality of converter chains, each chain connected to receive one of the copies of the television signals and including at least a tuner for tuning to a selected digitally modulated video channel and a demodulator for demodulating digital video data on the selected video channel;*

*a single conditional access unit, connected to said plurality of converter chains and having an authorization input, for decrypting the demodulated digital video data from said plurality of converter chains upon receiving an authorized input through the authorization input and said single conditional access unit individually outputting a plurality of decrypted baseband video signals simultaneously, each decrypted baseband video signal being associated with one of a plurality of individual television sets,* each of said converter chains further [includes] *including* a decompression unit for receiving one of the decrypted baseband video signals from said single conditional access unit and an RF modulator coupled between the decompression unit and a connection to one of the individual television sets*; and*

*at least one remote control receiver unit responsive to commands from individual remote controls associated with the individual television sets for controlling said converter chains and said single conditional access unit.*

19. [The digital video conversion system of claim 14] *A digital video conversion system connected to a television signal source, said system comprising:*

*a splitter connected to said signal source for simultaneously generating a plurality of copies of television signals received from said signal source;*

*a plurality of converter chains, each chain connected to receive one of the copies of the television signals and including at least a tuner for tuning to a selected digitally modulated video channel and a demodulator for demodulating digital video data on the selected video channel;*

*a single conditional access unit, connected to said plurality of converter chains and having an authorization input, for decrypting the demodulated digital video data from said plurality of converter chains upon receiving an authorized input through the authorization input and said single conditional access unit individually outputting a plurality of decrypted baseband video signals simultaneously, each decrypted baseband video signal being associated with one of a plurality of individual television sets; and*

*at least one remote control receiver unit responsive to commands from individual remote controls associated with the individual television sets for controlling said converter chains and said single conditional access unit,* wherein each individual television set is associated with one of the converter chains and each converter chain performs the functions of:

tuning to a selected digitally modulated video channel;

demodulating digital video data on the selected video channel;

providing the demodulated digital video data to said single conditional access unit;

decompressing the decrypted baseband video signal from said single conditional access unit; and modulating the decompressed baseband video signal into an analog video signal for viewing on the associated individual television set.

20. The digital video conversion system of claim 14 further comprising a main conversion box chassis which houses *said system outputs,* said splitter, said converter chains, said single conditional access unit and said at least one remote control receiver unit and wherein the tuner and the demodulator of at least one of the converter chains are each housed in individual modular units that can be plugged into the main conversion box chassis.

21. The digital video conversion system of claim 14 wherein each individual television set is associated with one of the converter chains and each converter chain performs the functions of:

tuning to a selected digitally modulated video channel;

demodulating digital video data on the selected video channel;

providing the demodulated digital video data to said single conditional access unit; and outputting the decrypted baseband video signal from said single conditional access unit to the individual television set.

*22. A digital video conversion system comprising:*

*a chassis having a plurality of outputs, each output being adapted to provide a decrypted television signal;*

*a plurality of converter chains within the chassis, each chain including at least a tuner and a demodulator;*

*at least one conditional access unit, housed within the chassis, connected to the plurality of converter chains and having an authorization input, for decrypting digital demodulated signals from the plurality of converter chains upon receiving an authorized input through the authorization input; and*

*at least one remote control receiver unit, housed within the chassis, responsive to commands from at least one individual remote control, the at least one individual remote control controlling the at least one conditional access unit and at least one of the converter chains.*

*23. The digital video conversion system of claim 22 wherein the at least one conditional access unit comprises only a single conditional access unit connected to the plurality of converter chains.*

*24. The digital video conversion system of claim 23 wherein the authorized input for enabling the single conditional access unit with respect to demodulated signals from any of the converter chains comprises a single smartcard.*

*25. The digital video conversion system of claim 23 wherein the at least one remote control receiver unit is a single RF remote control receiver responsive to the at least one individual remote control.*

*26. The digital video conversion system of claim 22 wherein each of the converter chains further includes a decompression unit for receiving decrypted signals from the at least one conditional access unit, and an RF modulator coupled between the decompression unit and one of the outputs.*

*27. The digital video conversion system of claim 22 wherein the tuner and the demodulator of at least one of the converter chains are each housed in individual modular units that can be plugged into the chassis.*

*28. A digital video conversion system connected to a cable drop, the system comprising:*

*a plurality of system outputs;*

*a splitter connected to the cable drop for simultaneously generating a plurality of frequency division multiplexed 6 MHZ QAM signals;*

*a plurality of converter chains, each chain including at least a tuner and a demodulator for receiving one of the frequency division multiplexed 6 MHZ QAM signals;*

*a single conditional access unit, connected to the plurality of converter chains and having an authorization input, for decrypting demodulated QAM signals from the plurality of converter chains upon receiving an authorized input through the authorization input and the single conditional access unit individually outputting a plurality of decrypted signals simultaneously, each decrypted signal being directed to one of the plurality of system outputs; and*

*at least one remote control receiver unit responsive to commands from at least one individual remote control for controlling the single conditional access unit and at least one of the converter chains.*

*29. The digital video conversion system of claim 28 wherein the authorized input for enabling the single conditional access unit with respect to demodulate QAM signals from any of the converter chains comprises a single smartcard.*

*30. The digital video conversion system of claim 28 wherein the at least one remote control receiver unit is a single RF remote control receiver responsive to the at least one individual remote control.*

*31. The digital video conversion system of claim 28 further comprising a main conversion box chassis that houses the system outputs, the splitter, the converter chains, the single conditional access unit and the at least one remote control receiver unit, the tuner and the demodulator of at least one of the converter chains each being housed in individual modular units that can be plugged into the main conversion box chassis.*

*32. The digital video conversion system of claim 28 wherein one individual television set is associated with one of the converter chains, the one converter chain performing the functions of:*

*tuning to a selected frequency division multiplexed, digitally modulated QAM video signal;*

*demodulating the selected digitally modulated QAM video signal;*

*providing the demodulated video signal to the single conditional access unit; and*

*outputting the decrypted signal from the single conditional access unit to the one individual television set.*

*33. A digital video conversion system connected to a cable drop, the system comprising:*

*a splitter connected to the cable drop for simultaneously generating a plurality of frequency division multiplexed 6 MHZ QAM signals;*

*a plurality of converter chains, each chain including at least a tuner and a demodulator for receiving one of the frequency division multiplexed 6 MHZ QAM signals;*

*a single conditional access unit, connected to the plurality of converter chains and having an authorization input,*

*for decrypting demodulated QAM signals from the plurality of converter chains upon receiving an authorized input through the authorization input and the single conditional access unit individually outputting a plurality of decrypted signals simultaneously;*

*at least one remote control receiver unit responsive to commands from at least one individual remote control for controlling the single conditional access unit and at least one of the converter chains; and*

*an output, wherein each of the converter chains further includes a decompression unit for receiving one of the decrypted signals from the single conditional access unit, and an RF modulator coupled between the decompression unit and the output.*

*34. A digital video conversion system connected to a cable drop, the system comprising:*

*a splitter connected to the cable drop for simultaneously generating a plurality of frequency division multiplexed 6 MHZ QAM signals;*

*a plurality of converter chains, each chain including at least a tuner, a demodulator for receiving one of the frequency division multiplexed 6 MHZ QAM signals and an output to one of a plurality of individual television sets;*

*a single conditional access unit, connected to the plurality of converter chains and having an authorization input, for decrypting demodulated QAM signals from the plurality of converter chains upon receiving an authorized input through the authorization input and the single conditional access unit individually outputting a plurality of decrypted signals simultaneously;*

*at least one remote control receiver unit responsive to commands from at least one individual remote control for controlling the single conditional access unit and at least one of the converter chains, wherein each converter chain performs the functions of:*

*tuning to a selected frequency division multiplexed, digitally modulated QAM video signal;*

*demodulating the selected digitally modulated QAM video signal;*

*providing the demodulated video signal to the single conditional access unit;*

*decompressing the decrypted signal from the single conditional access unit; and*

*modulating the decompressed video signal into an analog video signal for viewing on the associated individual television set.*

*35. A digital video conversion system connected to a television signal source, the system comprising:*

*a plurality of system outputs;*

*a splitter connected to the television signal source for simultaneously generating a plurality of copies of television signals received from the television signal source;*

*a plurality of converter chains, each chain connected to receive one of the copies of the television signals and including at least a tuner for tuning to a selected digitally modulated video channel and a demodulator for demodulating digital video data on the selected video channel;*

*a single conditional access unit, connected to the plurality of converter chains and having an authorization input, for decrypting the demodulated digital video data from the plurality of converter chains upon receiving an authorized input through the authorization input and the single conditional access unit individually outputting a plurality of decrypted baseband video signals simultaneously, each decrypted baseband video signal being associated with one of the plurality of converter chains and directed to one of the plurality of the plurality of system outputs; and*

*at least one remote control receiver unit responsive to commands from at least one individual remote control for controlling the single conditional access unit and at least one of the converter chains.*

*36. The digital video conversion system of claim 35 wherein the signal source comprises an LNB of a satellite antenna and the television signals provided by the television signal source comprise L-band frequency division multiplexed digitally modulated channels.*

*37. The digital video conversion system of claim 35 wherein the authorized input for enabling the single conditional access unit to decrypt demodulated digital video data comprises a smartcard.*

*38. The digital video conversion system of claim 35 wherein the at least one remote control receiver unit is a single RF remote control receiver responsive to the at least one individual remote control.*

*39. The digital video conversion system of claim 35 further comprising a main conversion box chassis that houses the system outputs, the splitter, the converter chains, the single conditional access unit and the at least one remote control receiver unit and wherein the tuner and the demodulator of at least one of the converter chains are each housed in individual modular units that can be plugged into the main conversion box chassis.*

*40. A digital video conversion system connected to a television signal source, the system comprising:*

*a splitter connected to the television signal source for simultaneously generating a plurality of copies of television signals received from the television signal source;*

*a plurality of converter chains, each chain connected to receive one of the copies of the television signals and including at least a tuner for tuning to a selected digitally modulated video channel and a demodulator for demodulating digital video data on the selected video channel;*

*a single conditional access unit, connected to the plurality of converter chains and having an authorization input, for decrypting the demodulated digital video data from the plurality of converter chains upon receiving an authorized input through the authorization input and the single conditional access unit individually outputting a plurality of decrypted baseband video signals simultaneously, each decrypted baseband video signal being associated with one of the plurality of converter chains;*

*at least one remote control receiver unit responsive to commands from at least one individual remote control for controlling the single conditional access unit and at least one of the converter chains; and*

*an output, wherein each of the converter chains further includes a decompression unit for receiving one of the decrypted baseband video signals from the single conditional access unit, and an RF modulator coupled between the decompression unit and the output.*

*41. A digital video conversion system connected to a television signal source, the system comprising:*

*a splitter connected to the television signal source for simultaneously generating a plurality of copies of television signals received from the television signal source;*

*a plurality of converter chains, each chain connected to receive one of the copies of the television signals and including at least a tuner for tuning to a selected digitally modulated video channel and a demodulator for demodulating digital video data on the selected video channel;*

*a single conditional access unit, connected to the plurality of converter chains and having an authorization input, for decrypting the demodulated digital video data from the plurality of converter chains upon receiving an authorized input through the authorization input and the single conditional access unit individually outputting a plurality of decrypted baseband video signals simultaneously, each decrypted baseband video signal being associated with one of the plurality of converter chains;*

*at least one remote control receiver unit responsive to commands from at least one individual remote control for controlling the single conditional access unit and at least one of the converter chains, wherein one of the converter chains has an associated television set, the one converter chain performing the functions of:*

*tuning to a selected digitally modulated video channel;*

*demodulating digital video data on the selected video channel;*

*providing the demodulated digital video data to the single conditional access unit;*

*decompressing the decrypted baseband video signal from the single conditional access unit; and*

*modulating the decompressed baseband video signal into an analog video signal for transmission to the associated individual television set.*

*42. A digital video conversion system comprising:*

*a plurality of system outputs;*

*an input that receives an input signal;*

*a plurality of converter chains operatively coupled with the input, each converter chain receiving the input signal, each converter chain including a tuner and a demodulator; and*

*a conditional access unit coupled to each of the plurality of converter chains, the conditional access unit decrypting at least one demodulated signal received from the at least one of the plurality of converter chains upon receipt of an authorized input, each decrypted signal being directed to one of the plurality of system outputs.*

*43. The digital video conversion system as defined by claim 42 further comprising:*

*a remote control receiver unit responsive to commands from an individual remote control, the individual remote control controlling the conditional access unit and at least one of the plurality of converter chains.*

*44. The digital video conversion system as defined by claim 42 wherein the authorized input comprises a smartcard.*

*45. The digital video conversion system as defined by claim 42 wherein the remote control receiver unit includes a RF remote control receiver that is responsive to the individual remote control.*

*46. The digital video conversion system as defined by claim 42 wherein the input signal is a digital signal.*

*47. The digital video conversion system as defined by claim 42 wherein the input comprises a splitter coupled with each of the converter chains.*

*48. A digital video conversion system comprising:*

*an input that receives an input signal;*

*a plurality of converter chains operatively coupled with the input, each converter chain receiving the input signal, each converter chain including a tuner and a demodulator; and*

*a conditional access unit coupled to each of the plurality of converter chains, the conditional access unit decrypting at least one demodulated signal received from the at least one of the plurality of converter chains upon receipt of an authorized input, each of the converter chains further including a decompression unit for receiving decrypted signals from the conditional access unit.*

*49. A digital video conversion system comprising:*

*a chassis having a plurality of system outputs, each system output providing a decrypted signal;*

*a plurality of converter chains, each chain including at least a tuner and a demodulator;*

*at least one conditional access unit connected to the plurality of converter chains, the conditional access unit decrypting digital demodulated signals from at least one of the plurality of converter chains in response to receiving an authorized input; and*

*at least one remote control receiver responsive to commands from at least one controller that controls the at least one conditional access unit and at least one of the converter chains.*

*50. The digital video conversion system of claim 49 wherein the at least one conditional access unit comprises only a single conditional access unit connected to the plurality of converter chains.*

*51. The digital video conversion system of claim 50 wherein the authorized input for enabling the single conditional access unit with respect to demodulated signals from any of the converter chains comprises a single smartcard.*

*52. The digital video conversion system of claim 49 wherein the tuner and the demodulator of at least one of the converter chains are each housed in individual modular units that can be plugged into the chassis.*

*53. A digital video conversion system comprising:*

*a chassis having at least one output that provides a decrypted signal;*

*a plurality of converter chains, each chain including at least a tuner and a demodulator;*

*at least one conditional access unit connected to the plurality of converter chains, the conditional access unit decrypting digital demodulated signals from at least one of the plurality of converter chains in response to receiving an authorized input, each of the converter chains further including a decompression unit for receiving decrypted signals from the at least one conditional access unit, and an RF modulator coupled between the decompression unit and one of the outputs; and*

*at least one remote control receiver responsive to commands from at least one controller that controls the at least one conditional access unit and at least one of the converter chains.*

* * * * *